(12) United States Patent
Liu et al.

(10) Patent No.: US 11,499,457 B1
(45) Date of Patent: Nov. 15, 2022

(54) ELECTRICALLY HEATED CATALYST FOR VEHICLE EXHAUST SYSTEM

(71) Applicant: FORD GLOBAL TECHNOLOGIES, LLC, Dearborn, MI (US)

(72) Inventors: Xin Liu, Novi, MI (US); Paul M Laing, Canton, MI (US); Douglas Allen Dobson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/368,203

(22) Filed: Jul. 6, 2021

(51) Int. Cl.
*F01N 3/20* (2006.01)
*B01J 35/00* (2006.01)

(52) U.S. Cl.
CPC ........ *F01N 3/2026* (2013.01); *B01J 35/0033* (2013.01)

(58) Field of Classification Search
CPC ............................ F01N 3/2026; B01J 35/0033
USPC ......................................................... 422/174
See application file for complete search history.

(56) References Cited

U.S. PATENT DOCUMENTS

| 9,657,621 B2 | 5/2017 | Upadhyay |
| 2019/0292963 A1* | 9/2019 | Takase ................. F01N 3/2026 |
| 2020/0400057 A1 | 12/2020 | Inoue et al. |

FOREIGN PATENT DOCUMENTS

| DE | 202020104976 U1 | 10/2020 |
| WO | 2021055199 A1 | 3/2021 |

* cited by examiner

*Primary Examiner* — Tom P Duong
(74) *Attorney, Agent, or Firm* — Vincent Mastrogiacomo; Brooks Kushman P.C.

(57) ABSTRACT

An exhaust aftertreatment device includes a catalyst assembly having an electrically conductive carrier matrix and first and second electrodes. The first and second electrodes have terminals attached on opposing sides of the catalyst assembly to be electrically connected to each other through the carrier matrix and configured to generate heat. A first elongate heat sink extends axially along the first electrode and is configured to absorb a portion of the heat to mitigate formation of hotspots.

20 Claims, 3 Drawing Sheets

ELECTRICALLY HEATED CATALYST FOR VEHICLE EXHAUST SYSTEM

TECHNICAL FIELD

This disclosure relates to exhaust systems and more particularly to electrically heated catalysts.

BACKGROUND

Vehicles may include an engine having an exhaust system. The exhaust system may include an aftertreatment device containing a catalyst. This is sometimes referred to as a catalytic converter. The catalytic converter includes a catalyst configured to convert raw exhaust gases into desired reaction products.

SUMMARY

According to one embodiment, an exhaust aftertreatment device includes a catalyst assembly having an outer cylinder and an electrically conductive carrier matrix disposed within the outer cylinder and a pair of electrodes attached on opposing sides of the outer cylinder to be electrically connected with the electrically conductive carrier matrix. Each of the electrodes support a terminal configured to connect with an electrical power source. The electrodes and the electrically conductive carrier matrix are configured to generate heat to warm the catalyst assembly. A plurality of heat sinks are each attached to an outer surface of the one of the electrodes and are configured to absorb heat produced by the electrodes to mitigate formation of hotspots.

According to another embodiment, an exhaust aftertreatment device includes a honeycomb structure having an outer cylinder and an electrically conductive carrier matrix supporting a catalyst. First and second arcuate electrodes are diametrically attached to the outer cylinder such that the carrier matrix forms an electric circuit from the first electrode to the second electrode. The electric circuit is configured to generate heat to warm the catalyst. A first elongate heat sink extends axially along an outer axial edge of the first electrode and is configured to absorb a portion of the heat to mitigate formation of hotspots.

According to yet another embodiment, an exhaust aftertreatment device includes a catalyst assembly having an electrically conductive carrier matrix and first and second electrodes. The first and second electrodes have terminals attached on opposing sides of the catalyst assembly to be electrically connected to each other through the carrier matrix and configured to generate heat. A first elongate heat sink extends axially along the first electrode and is configured to absorb a portion of the heat to mitigate formation of hotspots.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
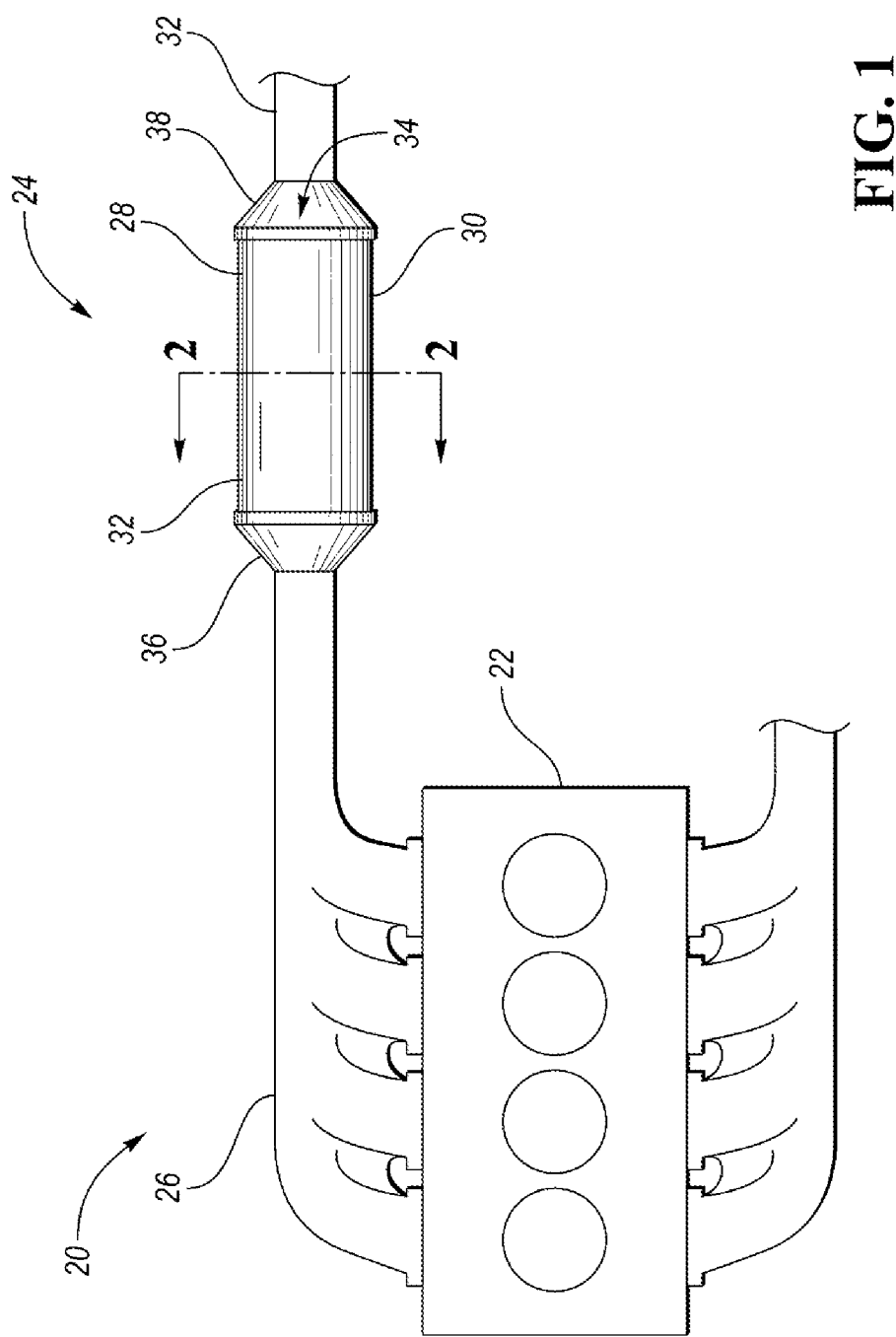
FIG. 1 is a schematic diagram of an engine system having an associated aftertreatment device with an electrically heated catalyst assembly.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context Referring to FIG. 1, an engine system 20 includes an internal-combustion engine 22 and an associated exhaust system 24. The exhaust system 24 includes an exhaust manifold 26 is mounted to a block of the engine. The exhaust system 24 further includes an aftertreatment device 28 that is connected in fluid communication with the exhaust manifold 26 via one or more pipes. The aftertreatment device 28 may be a catalytic converter or other device that includes an exhaust catalyst. The aftertreatment device 28 includes a housing, shell or body 30 that supports a catalyst assembly 32. The shell 30 may have a cylindrical shape and may be centered in line with the exhaust pipes. The shell 30 defines an internal cavity 34, an inlet cone 36 connected to the exhaust manifold 26 and an outlet cone 38 that is connected to the muffler (not shown) by one or more exhaust pipes.

The catalytic converter may be a two-way converter that combines oxygen with carbon monoxide and unburned hydrocarbons to produce carbon dioxide and water, or a three-way converter that also reduce oxides of nitrogen. The catalytic converter is highly efficient at converting the raw exhaust gases into the desired reaction products once operating temperatures are reached. Below this temperature, and more specifically below the light-off temperature, e.g., 300 degree Celsius, the chemical reactions do not take place or are incomplete. Thus, it is advantageous to heat the catalyst assembly 32 quickly. The emissions produced during cold start of the engine 22 may account for as much as one third of total emissions during a drive cycle. As such, reducing the warm-up time of the aftertreatment device 28 is effective for reducing emissions.

The aftertreatment device 28 may include a heater rather than relying solely on exhaust gases for heating the catalyst a light off temperature, i.e., the aftertreatment device is self-heating. The inclusion of the heater may significantly reduce time to light off. The heater may be in the form of an electrically heated catalyst (EHC) that utilizes Joule heating.

Figure 2:
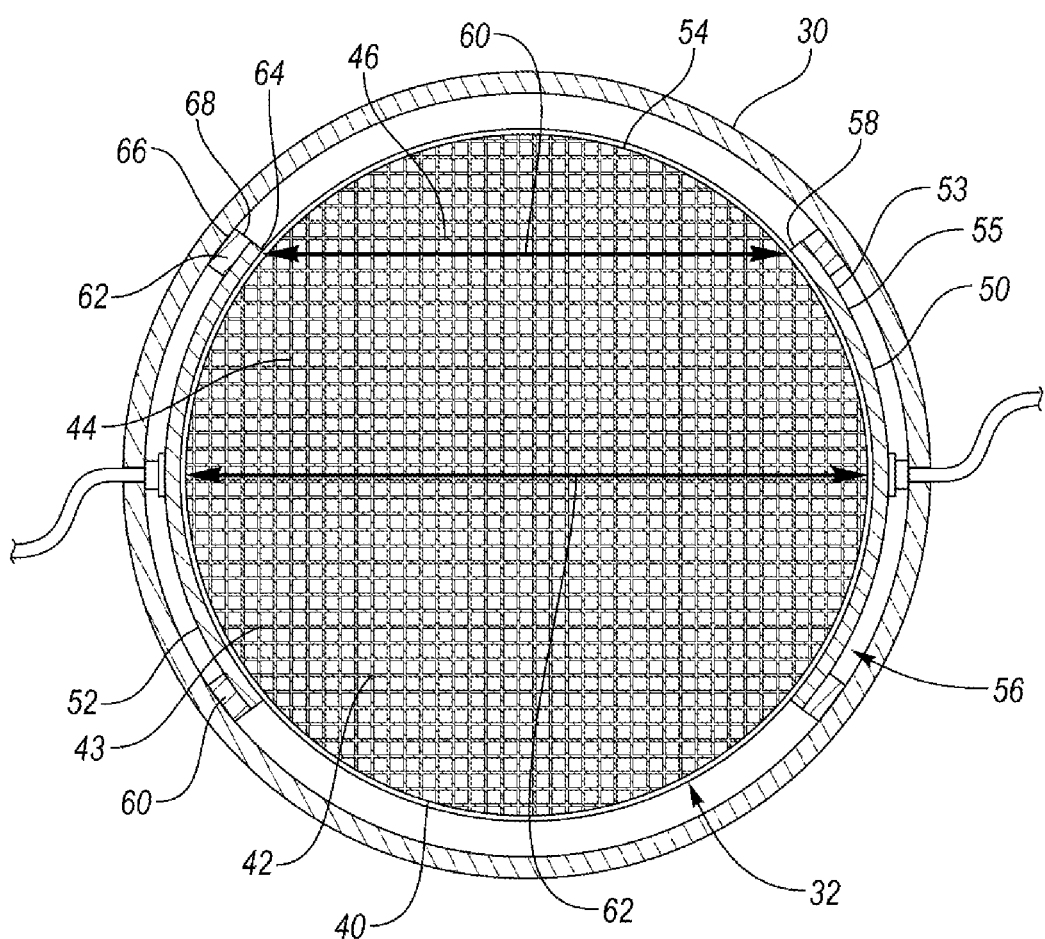
FIG. 2 is a cross-sectional view of the aftertreatment device along cutline 2-2.
Figure 3:
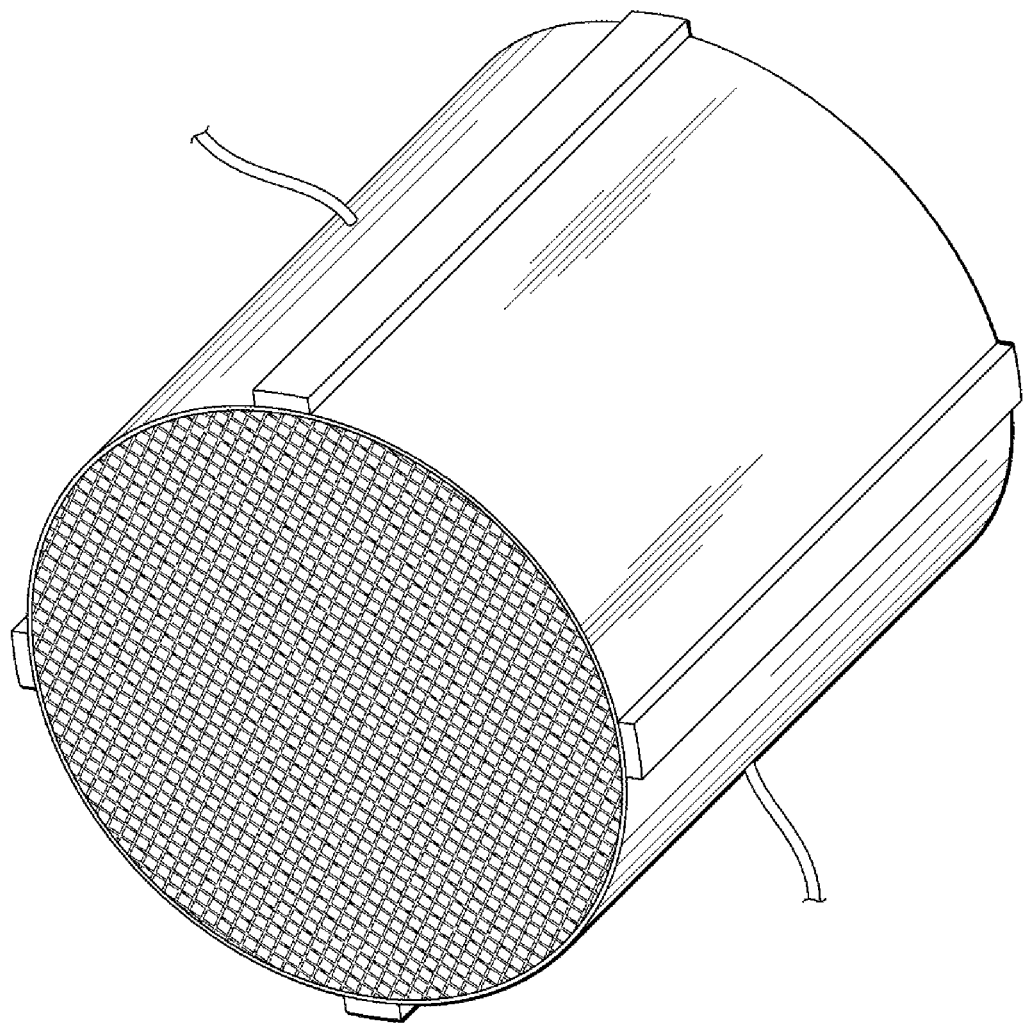
FIG. 3 is a perspective view of the electrically heated catalyst assembly.

Referring to FIGS. 2 and 3, the aftertreatment device 28 includes an electrically heated catalyst assembly 32 supported within the shell 30. The catalytic assembly 32 may generally be a circular cylinder. The catalyst assembly 32 may include an outer cylinder 40 and a ceramic carrier matrix 42 disposed within the outer cylinder 40. The carrier matrix 42 may be a honeycomb structure that has a plurality of walls 43 intersecting to define a plurality of channels 44. The channels 44 allow for the flow of exhaust gases therethrough. A highly porous ceramic coating, sometimes referred to as a washcoat, is applied to the surface of the walls to increase the surface area. Chemical catalysts 46, such as the precious metals platinum, palladium, and/or rhodium, are embedded in the washcoat.

The catalyst assembly 32 is configured to self-heat through Joule heating. According to one embodiment, the catalyst assembly 32 includes a pair of electrodes 50 and 52. The electrodes may the attached to the outer surface 54 of the outer cylinder 40 to diametrically opposed each other. The electrodes 50, 52 may be arcuate, e.g., a sectional portion of a circular tube, and have an inner arcuate surface 53, and outer arcuate surface 55 and a pair of longitudinal (axial) edges 58. The edges 58 may extend longitudinally (axially) from a front 57 of the electrode to the back 59 of the electrode and may extend radially from the inner arcuate surface 53 to the outer arcuate surface 55. The inner arcuate surface 53 has an inner radius that matches with the radius of the outer surface 54 so that the electrodes may be received on the outer cylinder 42.

Each of the electrodes 50, 52 is electrically connected with the carrier matrix 42, which is electrically conductive. The carrier matrix 42 may include electrically conductive ceramics. Each of the electrodes includes an associated terminal 56 that connects the electrode to an electric circuit. The electrode 50 may be a positive electrode and the electrode 52 may be a negative electrode. During operation, the positive electrode 50 receives voltage and current from a power source, such as a vehicle electrical system, the current then flows from the positive electrode 50 to the negative electrode 52 via the electrically conductive carrier matrix 42, which has a high electrical resistance. This flow of current through the catalyst assembly 32 generates Joule heating to heat the catalyst 46.

The heat produced by the catalyst assembly, and thus the time to light-off, may depend upon the electric power delivered to the positive electrode 50. Providing higher power, e.g., in excess of 4 kW, may reduce light off time and emissions. Providing this higher power, however, requires design modifications to mitigate hotspots. The arcuate shape of the electrodes 50, 52 causes the electrical paths through the carrier matrix 42 to be shortest at the edges 58 of the electrodes. (As shown in FIG. 2, the edge paths 60 are shorter than the central path 62.) Unmitigated, this can cause the edge portions of the electrodes 50, 52 to become substantially hotter than the other portions of the electrode, i.e., the electrodes/carrier matrix have hotspots along the longitudinal edges 58 due to the shorter electrical path. In some cases, the edge portion may reach a temperature of 1400 degrees Celsius (C), whereas the central regions are only 400 degrees C. This is inefficient and a more uniform temperature across the electrode can produce better heating of the catalyst 46.

To mitigate hotspots, the catalyst assembly 32 includes one or more heat sinks 60 at the hotspots to absorb the accumulation of excess heat in those areas and provide more uniform temperatures of the electrodes and carrier matrix. In the illustrated embodiment, four heat sinks 60 are utilized.

The heat sinks 60 are located at the edge portions of the electrodes 50, 52. The heat sinks 60 are formed of a thermally conductive material that conducts heat from these areas, thus mitigating the hotspots. In the illustrated embodiment, each electrode 50, 52 includes a pair of associated heat sinks 60 that are disposed along the longitudinal edges 58. In other embodiments, more or less heat sinks may be attached to the electrodes depending upon the location and severity of the hotspots. The size and mass of the heat sinks 60 may be increased or decreased based on the temperature differential between the hotspots and the cooler areas of the electrode. Generally, a larger and more massive heat sink can conduct more thermal energy than a smaller and less massive heat sink of a same material. Of course, different materials have different thermal properties and one material may allow for a smaller heat sink verse another material.

According to one or more embodiments, each heat sink 60 may have an elongate body 62 that extends longitudinally along an edge portion of the electrode. In some embodiments, the heat sinks 60 may extend the entire length of the electrode, i.e., from the front 57 to the back 59. The elongate body may include an inner side 64 that is received on the outer surface 55 of the electrode, an outer side 66, and longitudinal sides 68 that extend longitudinally between end sides 70. The inner side 64 may be arcuate and have a radius that matches the radius of the outer surface 55. The elongate body 62 may be placed on the electrode such that one of the longitudinal sides 68 is substantially coplanar with one of the edges 58. In the illustrated embodiment, the distance between the sides 68 is larger than the distance between the inner and outer sides 66, 68, however, this disclosure is not limited to such designs and the distance between the sides 68 may be smaller than the distance between the inner and outer sides 66, 68 in other embodiments.

The elongate body 62 may be formed of any thermally conductive material. In one or more embodiments, the elongate body 62 is a metal plate. Example metals include copper, aluminum, and metal oxide (such as zirconia or ceria zirconia). The elongate body 62 may be a homogeneous material, such as solid copper or copper alloy, or may be formed of two or more thermally conductive materials. For example, the materials may be formed into radial layers or axial segments.

The inclusion of the heat sink(s) substantially reduces the temperature differential between the hottest portions of the electrode and the coolest portions of the electrode. For example, testing has shown that the inclusion of the heat sinks 60 can reduce the temperature spread from about 1000 degrees C. to about 500 degrees C. Additionally, testing has shown that while the heat sinks absorb thermal energy, they did not have a substantial effect on the temperature of the central portion of the carrier matrix. That is, the heat sinks effectively eliminate excess heat from the hotter areas without affecting heating of the catalysts or prolonging light-off.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An exhaust aftertreatment device comprising:
a catalyst assembly including an outer cylinder and an electrically conductive carrier matrix disposed within the outer cylinder;
a pair of electrodes attached on opposing sides of the outer cylinder to be electrically connected with the electrically conductive carrier matrix, each of the electrodes supporting a terminal configured to connect with an electrical power source, wherein the electrodes and the electrically conductive carrier matrix are configured to generate heat to warm the catalyst assembly; and
a plurality of heat sinks, each heat sink being attached to an outer surface of the one of the electrodes and configured to absorb heat produced by the one of the electrodes to mitigate formation of hotspots.

2. The exhaust aftertreatment device of claim 1, wherein each of the heat sinks includes a thermally conductive elongate body oriented to extend in an axial direction of the catalyst assembly.

3. The exhaust aftertreatment device of claim 2, wherein the thermally conductive elongate body is formed of metal.

4. The exhaust aftertreatment device of claim 2, wherein the thermally conductive elongate body extends an entire axial length of the one of the electrodes.

5. The exhaust aftertreatment device of claim 1, wherein each of the heat sinks is an elongate metal plate extending longitudinally relative to the outer cylinder.

6. The exhaust aftertreatment device of claim 1, wherein the outer surface of the electrode is an arcuate surface, and wherein each of the electrodes further includes an inner arcuate surface attached to the cylindrical body and opposing edges each extending between the inner and outer arcuate surfaces.

7. The exhaust aftertreatment device of claim 6, wherein each of the heat sinks includes an elongate body extending along one of the edges of the one of the electrodes.

8. The exhaust aftertreatment device of claim 7, wherein each of the electrodes includes a pair of associated ones of the heat sinks that are located at the opposing edges.

9. The exhaust aftertreatment device of claim 1, wherein the electrically conductive matrix is a honeycomb structure.

10. The exhaust aftertreatment device of claim 9, wherein the honeycomb structure includes electrically conductive ceramics.

11. An exhaust aftertreatment device comprising:
a honeycomb structure including an outer cylinder and an electrically conductive carrier matrix supporting a catalyst;
first and second arcuate electrodes each including an inner arcuate surface, and outer arcuate surface, and a pair of opposing first and second outer edges connecting between the inner and outer arcuate surfaces and extending axially along an entire length of the electrode, the inner arcuate surfaces of the first and second arcuate electrodes being diametrically attached to the outer cylinder such that the carrier matrix forms an electric circuit from the first electrode to the second electrode, wherein the electric circuit is configured to generate heat to warm the catalyst; and
a first elongate heat sink extending axially along the first outer edge of the first electrode and configured to absorb a portion of the heat to mitigate formation of hotspots.

12. The exhaust aftertreatment device of claim 11 further comprising a second elongate heat sink extending axially along the second outer edge of the first electrode and configured to absorb a portion of the heat to mitigate formation of hotspots.

13. The exhaust aftertreatment device of claim 11 further comprising a second elongate heat sink extending axially along the first outer edge of the second electrode and configured to absorb a portion of the heat to mitigate formation of hotspots.

14. The exhaust aftertreatment device of claim 11 further comprising:
a second elongate heat sink extending axially along the second outer edge of the first electrode and configured to absorb a portion of the heat to mitigate formation of hotspots; and
a third elongate heat sink extending axially along the first outer edge of the second electrode and configured to absorb a portion of the heat to mitigate formation of hotspots.

15. The exhaust aftertreatment device of claim 11, wherein first elongate heat sink is a metal plate.

16. The exhaust aftertreatment device of claim 11, wherein the first elongate heat sink extends axially along the entire first outer edge of the first electrode.

17. An exhaust aftertreatment device comprising:
a shell having an inner surface defining an internal cavity;
a catalyst assembly disposed in the cavity and including an electrically conductive carrier matrix;
first and second electrodes disposed in the cavity, the first and second electrodes having terminals and attached on opposing sides of the catalyst assembly to be electrically connected to each other through the carrier matrix and configured to generate heat; and
a first elongate heat sink extending axially along the first electrode and configured to absorb a portion of the heat to mitigate formation of hotspots, wherein the shell circumscribes the heat sinks with an outer surface of the heat sink in contact with the inner surface of the shell.

18. The exhaust aftertreatment device of claim 17 further comprising a second elongate heat sink extending axially along the second electrode and configured to absorb a portion of the heat to mitigate formation of hotspots.

19. The exhaust aftertreatment device of claim 18, wherein the first elongate heat sink extends axially along an outer axial edge of the first electrode and the second elongate heat sink extends axially along an outer axial edge of the second electrode.

20. The exhaust aftertreatment device of claim 19, wherein the first elongate heat sink extends axially along an entire axial length of the first electrode, and the second elongate heat sink extends axially along an entire axial length of the second electrode.

* * * * *